US012675569B2

(12) United States Patent
Aalto et al.

(10) Patent No.: US 12,675,569 B2
(45) Date of Patent: Jul. 7, 2026

(54) METHOD OF PREVENTING FRAUD

(71) Applicant: Supercell Oy, Helsinki (FI)

(72) Inventors: Markus Aalto, Helsinki (FI); Jonas Collaros, Helsinki (FI); Tommi Suvinen, Helsinki (FI); Tristan Williams, Helsinki (FI); Antti Takala, Helsinki (FI); Pauli Kaila, Helsinki (FI)

(73) Assignee: Supercell Oy, Helsinki (FI)

( * ) Notice: Subject to any disclaimer, the term of this patent is extended or adjusted under 35 U.S.C. 154(b) by 0 days.

(21) Appl. No.: 18/668,862

(22) Filed: May 20, 2024

(65) Prior Publication Data

US 2025/0356003 A1 Nov. 20, 2025

(51) Int. Cl.
    *G06F 21/55*     (2013.01)
    *G06F 9/451*     (2018.01)
(52) U.S. Cl.
    CPC ............ *G06F 21/554* (2013.01); *G06F 9/451* (2018.02); *G06F 2221/033* (2013.01)
(58) Field of Classification Search
    None
    See application file for complete search history.

(56) References Cited

U.S. PATENT DOCUMENTS

2010/0146384 A1* 6/2010 Peev ........................ G06F 9/451
                                                 715/255
2015/0222730 A1* 8/2015 Gower .................... H04L 65/70
                                                 709/203

2015/0268855 A1* 9/2015 Griffin ................ G06F 3/04897
                                                 345/173
2019/0282898 A1 9/2019 Perry
2019/0377461 A1 12/2019 Akhanov et al.
2022/0001283 A1 1/2022 Lundquist et al.
2022/0362664 A1 11/2022 Tahkokallio et al.

OTHER PUBLICATIONS

Anonymous, Prevent Multiplayer Cheating, The Wayback Machine Game Development, Apr. 17, 2024, 5 Pages.
European Patent Office, International Search Report and Written Opinion of the International Searching Authority, International Application No. PCT/FI2025/050200, Dated Jun. 4, 2025, 15 Pages.
Metzger Florian et al., An Introduction to Online Video Game QoS and QoE Influencing Factors, IEEE Communications Surveys & Tutorials, vol. 24, No. 3, May 21, 2022, pp. 1894-1925.

(Continued)

*Primary Examiner* — Syed A Roni
(74) *Attorney, Agent, or Firm* — ZIEGLER IP LAW GROUP, LLC.

(57) ABSTRACT

Disclosed is method for preventing fraud in application executed in device, method including providing application to device, wherein application has a first data model module and viewer module; using viewer module rendering on user interface of display of device, first user view of application, first user view including set of visible graphical objects, wherein first user view is rendered based on data of first data module; detecting triggering event; based on detected triggering event, providing update data module to application for updating first data model module; detecting control event; and based on detected control event, rendering updated user view of application on user interface of device using updated first data model module.

11 Claims, 10 Drawing Sheets

(56) References Cited

OTHER PUBLICATIONS

Addison et al. "Motion Prediction for Caching and Prefetching in Mouse-Driven DVE Navigation" ACM Transactions on Internet Technology, vol. 5, No. 1 Feb. 2005, 22 pages.
European Patent Office, Written Opinion of the International Preliminary Examining Authority, Application No. PCT/FI2025/050200, mailed Nov. 14, 2025, 9 pages.

* cited by examiner 714      712      710

METHOD OF PREVENTING FRAUD

TECHNICAL FIELD

The present disclosure relates to methods for preventing fraud in an application executed in a device. Moreover, the present disclosure relates to systems for preventing fraud in an application executed in a device.

BACKGROUND

In today's world, a wide range of applications serving a variety of purposes are used on all sorts of electronic devices such as computers, mobile phones, smartwatches, and the like. Conventionally, an architecture of the applications involves a model (i.e., data and business logic), a view (i.e., user interface) and a controller (for managing interactions between the model and the view). Typically, all of the data that is related to the model of the application is downloaded in a device of user.

However, downloading the data related to the model of the application all at once is of high risk, as the downloaded data is open to be accessed by any hacker or an unauthorized person. Any hacker or the unauthorized person that has access to such data can use it to gain unfair advantages while using the application and provides an opportunity to other users as well for committing fraud in using the application.

Therefore, in light of the foregoing discussion, there exists a need to overcome the aforementioned drawbacks.

SUMMARY

The aim of the present disclosure is to provide a method and a system to ensure than an application is used without any fraud or unfair means.

The aim of the present disclosure is achieved by a method and a system for preventing fraud in an application executed in a device, as defined in the appended independent claims to which reference is made to. Advantageous features are set out in the appended dependent claims.

In a first aspect, an embodiment of the present disclosure provides a method for preventing fraud in an application executed in a device, according to claim 1.

In a second aspect, an embodiment of the present disclosure provides a system for preventing fraud in an application executed in a device, according to claim 9.

Throughout the description and claims of this specification, the words "comprise", "include", "have", and "contain" and variations of the words, for example "comprising" and "comprises", mean "including but not limited to", and do not exclude other components, integers or steps. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
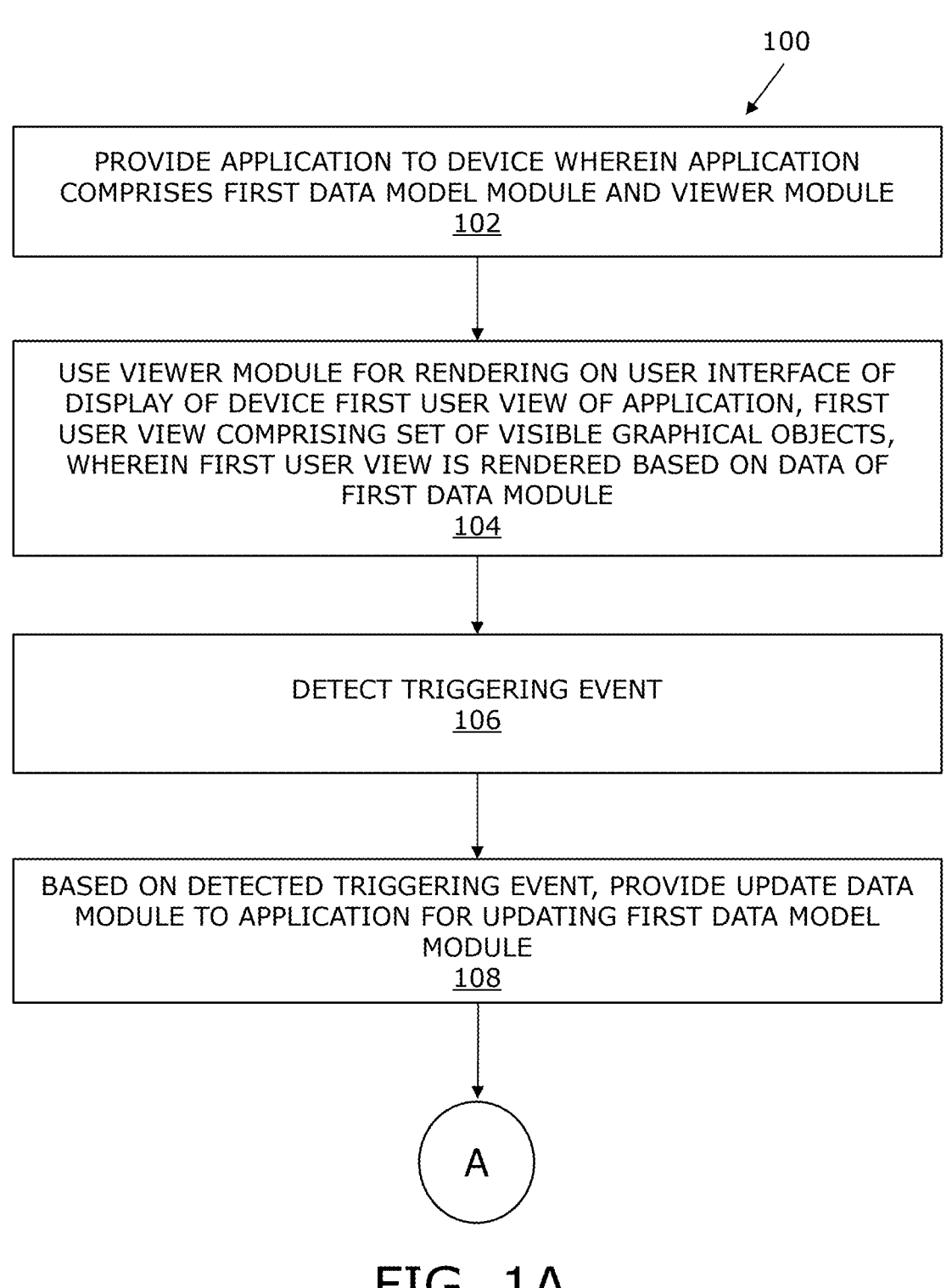
FIGS. 1A and 1B collectively is a flowchart depicting steps of a method for preventing fraud in an application executed in a device, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a method for preventing fraud in an application executed in a device, the method comprising:

providing the application to the device, wherein the application comprises a first data model module and a viewer module;

using the viewer module for rendering on a user interface of a display of the device, a first user view of the application, the first user view comprising a set of visible graphical objects, wherein the first user view is rendered based on data of the first data module;

detecting a triggering event;

based on the detected triggering event, providing an update data module to the application for updating the first data model module;

detecting a control event; and based on the detected control event, rendering an updated user view of the application on the user interface of the device using the updated first data model module.

In a second aspect, the present disclosure provides a system for preventing fraud in an application executed in a device, comprising:

the device, the device comprising a display, a computing unit and a memory, wherein:

the application is stored in the memory, and the application comprises a first data model module and a viewer module; and the computing unit is configured execute the application stored in the memory to:

render on the display a first user view with the viewer module using data of the first data model module;

detect a triggering event; and form, based on the detected triggering event, a request for a data update and send the request to a server; and the server configured to:

receive the data update request;

send an update data module based on the request to the device; and wherein, the computing unit is further configured to update the first data model module based on the update data module, detect a control event and render on the display an updated user view using the updated first data model module when the control event is detected.

The present disclosure provides the aforementioned method and the aforementioned system for preventing fraud in an application executed in a device. The method ensures that all information related to features and objects present in the application is not included in the first data model module. Thus, beneficially, any unauthorized person is unable to access any information in the first data model module which they are not supposed to and prevents any chances of any fraud taking place in the application using such information gained from unauthorized access. Moreover, the first data model module is updated only after detecting the control event and thus, advantageously, any additional features and objects in the application are rendered in the user interface only when they are supposed to be made visible to the user.

Throughout the present disclosure, the term "application" refers to a software program or a set of computer instructions designed to perform a particular purpose or provide a specific service to a user. The application may range from a simple utility and productivity tool to a complex software solution for various domains such as gaming, communication, education, entertainment, finance, healthcare, and the like. The application is executed on the device that is associated with the user. Herein, the device may be one of: a computer, a mobile phone, a laptop, a smartwatch, and the like. Notably, the device has computing and processing capabilities that enables the application to be executed in the device. In an implementation, the application is used by multiple users, where the application is thus, executed in the corresponding devices of the each of the multiple users.

Throughout the present disclosure, the term "fraud" refers to use of any unfair means in using the application which provide unfair advantages or benefits to the user that is committing fraud in using the application. For example, in a gaming application, there are hidden objects that are visible to the user only after fulfilment of a certain criteria, however, the user may commit the fraud by making the hidden objects to be visible before they are meant to be by tampering with information contained in the first data model module. Notably, preventing the fraud in the application is important to provide fair and equal benefits to all the users that are using the application.

The method comprises providing the application to the device, wherein the application comprises the first data model module and the viewer module. Throughout the present disclosure, the term "first data model module" refers to data that contains information related to parameters of certain objects are to be utilized in operation of the application. For example, the first data model module for a gaming application contains information about two visible graphical objects which are a mortar and a mine, respectively. The first data model module further contains data that the mortar is located at coordinates (50, 200) and has a range in radius of 200 pixels, whereas the mine is located at the coordinates (100, 250) and has a range in radius of 10 pixels. It will be appreciated that a said data model module for any application may contain information related to objects which can be made visible to the user from a start of use of that application, and the information of those objects as well that are made visible to the user only after fulfilment of some said predefined criteria. Thus, if the information related those objects of the application which are to be made visible to the user only after fulfilment of the predefined criteria is available in the first data model module, then, access to the first data model module enables to user to know about such sensitive information beforehand and then use the application to get those objects made visible to them in an unfair and unauthenticated use of the application (i.e., essentially committing fraud in using the application). Thus, the first data model module, beneficially, is kept free from such sensitive information that enables the user to commit fraud. Throughout the present disclosure, the term "viewer module" refers to that specific module of data that is required to render any information visually or graphically on the display of the device. Notably, the viewer module also enables the user to interact with the visually or graphically rendered information on the display of the device.

Moreover, the method comprises using the viewer module for rendering on the user interface of a display of the device, the first user view of the application, the first user view comprising the set of visible graphical objects, wherein the first user view is rendered based on the data of the first data module. Throughout the present disclosure, the term "display" refers to the screen of the apparatus. Typically, the display screen is configured to provide visual graphics of the user interface to the user. Throughout the present disclosure, the term "user interface" refers to a space where interaction between the user and the application occurs. Beneficially, the interaction between the user and application allows effective operation and control therebetween. Moreover, the user interface is designed to allow the user to interact easily, efficiently, and in a user-friendly manner with the application to provide maximum usability, thereby reducing the amount of user input to achieve a desired output.

Typically, the user interface may be composed of one or more layers, including a human-machine interface (HMI) that interfaces machines with physical input hardware such as keyboards, a mouse, a touch screen or a game pad; and output hardware such as a computer monitor, a speaker, a printer, and the like. Moreover, a user interface layer may interact with one or more human senses, and may comprise at least one of: tactile UI (touch), visual UI (sight), auditory UI (sound), olfactory UI (smell), equilibria UI (balance), gustatory UI (taste). Moreover, the aforementioned user interface, when sound is added to the user interface, becomes a multimedia user interface (MUI).

Herein, the user interface is such that the set of visible graphical objects are rendered in the first user view on the display which enables the user to interact with the set of visible graphical objects. It will be appreciated that the viewer module is used to render the set of visible graphical objects in the user interface using the information present in the first data model module. Notably, the set of visible graphical objects that are rendered in the first user view comprises only those objects which are to be displayed to the user from the start of the operation of the application and subsequently, whose information is present inside the first data model module.

Optionally, the first user view is a preview mode of the application. Throughout the present disclosure, the term "preview mode" refers to a mode of operation of the application in which the user is able to only view contents of the application without performing any interaction with the contents of the application. The technical effect of the first user view being the preview mode is that during a stage when the application is in the preview mode, only the first set of visible graphical objects are made visible to the user, and any additional features and objects that are to be made available to the user are still kept hidden in the application. Thus, beneficially, the application is prevented from any fraud taking place.

Furthermore, the method comprises the triggering event. Throughout the present disclosure, the term "triggering event" refers to an event that indicates that a change is required in the mode of operation of the application. The occurrence of the triggering event denotes that the application is moving onto a next stage in its operation and thus, the application now requires an update in its first data model module to be suitable for proving additional features and objects to the user in the application.

Optionally, the triggering event is at least one of: selection of a user interface element for changing application from the preview mode to an active mode, expiration of a timer associated with the preview mode, providing an action command to any of the first set of visible graphical objects on the user interface. Throughout the present disclosure, the term "user interface element" refers to an element of the user interface that enables the user to interact with the application to provide an input for changing the mode of operation of the application from the preview mode to the active mode. Optionally, the user interface element is in a form of a tap button that is displayed in the user interface. Throughout the present disclosure, the term "active mode" refers to the mode of operation of the application in which the user is actively interacting with the first set of visible graphical objects such as moving or using any of the first set of visible graphical objects for performing any task or activity. Thus, changing the application from the preview mode to the active mode denotes that the application is now to be switched from one mode of operation to another mode of operation.

Optionally, the application is designed in a way that ensures that the application stays in the preview mode for a predefined period of time whose kept using the timer present in the application. Subsequently, the expiration of timer acts as the triggering event indicating that the application is ready to be switched from the preview mode to the another mode of operation. Herein, providing the action command to any of the set of visible graphical objects indicates that the user now wants to actively interact with the application by performing any action with any of the set of visible graphical objects, which acts as the triggering event for the application. The technical effect is that the triggering event occurs when the application exits the preview mode and subsequently, the application requires to switch its mode of operation for allowing the user to effectively interact with the application.

Optionally, the triggering event is one of: detecting a selection of a user controllable graphical object, a movement of the user controllable graphical object across a boundary in the user interface, a location change of the user controllable graphical object from a first location on the user interface to a second location on the user interface, a location of the user controllable graphical object within the user interface. Throughout the present disclosure, the term "user controllable graphical object" refers to an object that is graphically rendered in the user interface which is controlled based on inputs of the user. For example, the user is able to control the movement or to perform any task in the application with the user controllable graphical object. The technical effect is that the triggering event is set to occur only when the user controllable graphical object is at specific states which relates to the need for change in the mode of operation of the application. Notably, the specific states of the user controllable graphical object is one of: when the user controllable graphical object is selected, when the user controllable graphical object is moved across the boundary in the user interface, the location of the user controllable graphical object within the user interface, when the location of the user controllable graphical object is changed from the first location on the user interface to the second location on the user interface.

Optionally, the triggering event is created based on timing information based on movement parameters of the user controllable graphical object. Some of applications the user controllable graphical object is programmed to move along predetermined path with predetermined speed. This can be used to calculate time when the said user controllable graphical object for example crosses a half way of user view of the application or is within certain distance from a location on the user interface. Technical effect of this is that timing of sending the update data model can be set based on movement parameters. This way update data module can be provided despite of possible lag or jitter in the system.

Furthermore, the method comprises based on the detected triggering event, providing the update data module to the application for updating the first data model module. Throughout the present disclosure, the term "update data module" refers to a data module which has new additional information related to the parameters of the additional features and objects that are to be added in the first data model module. Notably, updating the first data model module is done by adding the new additional information present in the update data module into the first data model module.

Optionally, the provided update data module comprises data related to at least one of: hidden graphical objects, parameters of the set of visible graphical objects. Throughout the present disclosure, the term "hidden graphical objects" refers to certain objects present in the application which are kept hidden in the user interface until a certain precondition is fulfilled by the user while using the application. Optionally, the precondition may that the location of the user controllable object is to be within a threshold range of distance (where the distance is calculated in pixels) from a location of the hidden graphical object. The technical effect is that the first data model module is accordingly updated to include the data related to the hidden graphical objects and also include information related to those parameters of the set of visible graphical objects which were previously not present in the first data model module. Thus, advantageously, the updated first data model module is suitable for rendering the hidden graphical objects and additional features in the set of visible graphical objects.

Furthermore, the method comprises detecting the control event. Throughout the present disclosure, the term "control event" refers to an event which is associated with an activity that is performed by the user in the application in respect to controlling the features and objects of the application. Notably, the detection of the control event indicates that the application now requires an update in the first user view to render additional content in the user interface whose corresponding data is present in the updated first data model module.

Optionally, the control event is one of: detecting a control input associated with the user controllable graphical object on the user interface, a movement of the user controllable graphical object across a boundary on the user interface, a location change of the user controllable graphical object from a first location to a second location on the user interface, a distance of the user controllable graphical object from at least one of the hidden graphical objects on the user interface. In this regard, detecting a certain type of input by the user for controlling the user controllable graphical object acts as the control event. Likewise, the distance of the user controllable graphical object from the at least of the hidden graphical objects being within a predefined range for distance acts as the control event. The technical effect is that one of specific types of action of the user controllable graphical object acts as the control event indicating that the application now requires to render contents of the updated first data model module in the user interface.

Furthermore, the method comprises based on the detected control event, rendering the updated user view of the application on the user interface of the device using the updated first data model module. Throughout the present disclosure, the term "updated user view" refers to a user view that is rendered by using the updated information in the updated first data model module (i.e., the data model module obtained by updating the first data model module). Subsequently, in the updated user view that is rendered on the user interface, the new features and objects whose additional information was added in the updated first data model module are now also rendered in the updated user view. Thus, those additional features and objects are rendered in the user interface at a right time only after the control event is detected and not beforehand the detection of the control event which prevents any chance of fraud in using the application.

Optionally, the rendered updated user view comprises the at least one of the hidden graphical objects rendered to be visible to the user of the user interface of the device. In this regard, since the predefined condition for the at least one of the hidden graphical objects to be made visible in the user interface is fulfilled with the detection of the control event, thus, the data related to the at least one of the hidden graphical objects present in the updated first data model module is used to render the at least one of the hidden graphical objects in the user interface. The technical effect is that beneficially, the at least one of the hidden graphical objects is rendered only after the control event is detected, thus preventing any fraud in the use of the application.

The present disclosure also relates to the system. Various embodiments and variants disclosed above, with respect to the aforementioned method, apply mutatis mutandis to the system.

Throughout the present disclosure, the term "computing unit" refers to a fundamental component of the system that is capable of executing instructions and performing computations. Notably, the computing unit is in form of a hardware component that carries out required tasks which are essential for functioning of the system. Optionally, the computing unit comprises a Control Processing Unit (CPU) and a Memory Unit.

Throughout the present disclosure, the term "memory" refers to an electronic storage space which is used to store data, instruction or program codes. Optionally, the memory may include, but is not limited to, an electronic storage device, a magnetic storage device, an optical storage device, an electromagnetic storage device, a semiconductor storage device, or any suitable combination of the foregoing. Examples of implementation of the memory, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory.

Throughout the present disclosure, the term "server" refers to a powerful physical or virtual infrastructure that has been virtualized, to perform application- and information-processing storage and enable accessing of the stored information by users remotely over a data communication network. The server includes suitable logic, circuitry, interfaces, and/or code that is configured to store, process and/or receive the information from the apparatus corresponding to the received request. It will be appreciated that the server may be a cloud server. In addition, the server may be a single server or a plurality of servers operating in a parallel or distributed architecture to operatively couple with the disclosed apparatus or similar systems. Examples of the server include, but is not limited to, a storage server, a web server, an application server, or a combination thereof.

Optionally, the triggering event is at least one of: detecting selection of a user interface element, expiration of timer, a movement of the device, a movement of a user controllable graphical object along the rendered first user view.

Optionally, timing of sending the update data module from the server is based on predicted movement of the user controllable graphical object along the rendered first user view. The technical effect is that the system is able to successfully predict any movement of the user controllable graphical object and thus, accordingly, synchronize the timing of sending the update data module such that the update data module is beneficially, received by the computing unit just after the triggering event is detected without any significant delay.

In an implementation scenario, for the gaming application that is executed in the device, the first data model module contains data of the mortar and the mine along with the location and range for both the mortar and the mine respectively. Subsequently, the triggering event is detected when a tap button is pressed in the user interface. As a result, the first data model module is updated based on an update data module, where the updated first data model module now additionally contains data about a hidden defence tower located at coordinates (200, 300) and has a threshold range for distance of 150 pixels from the location of the hidden defence tower. Subsequently, the control event detected when the user moves the user controllable graphical object to be a location within the threshold range of 150 pixels from the location of the hidden defence tower. As a result, the updated user view is rendered in the user interface based on the updated first data model module to make the hidden defence tower now visible to the user in the updated user view.

DETAILED DESCRIPTION OF THE DRAWINGS

Figure 1B:
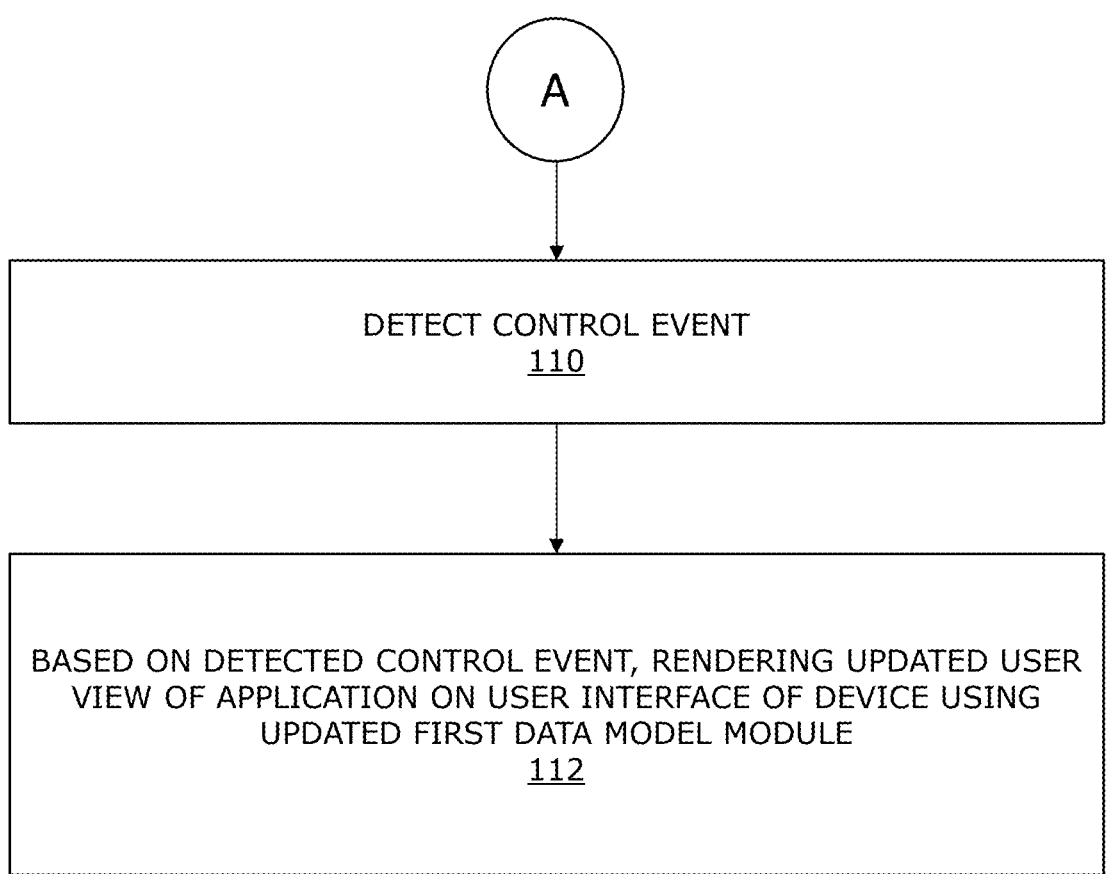

Referring to FIGS. 1A and 1B collectively illustrated is a flowchart 100 depicting steps of a method for preventing fraud in an application executed in a device, in accordance with an embodiment of the present disclosure. At step 102, the application to the device is provided, wherein the application comprises a first data model module and a viewer module. At step 104, the viewer module is used for rendering on a user interface of a display of the device a first user view of the application, the first user view comprising a set of visible graphical objects, wherein the first user view is rendered based on data of the first data module. At step 106, a triggering event is detected. At step 108, based on the detected triggering event, an update data module is provided to the application for updating the first data model module. At step 110, a control event is detected. At step 112, based on the detected control event, an updated user view of the application is rendered on the user interface of the device using the updated first data model module.

The aforementioned steps 102, 104, 106, 108, 110 and 112 are only illustrative and other alternatives can also be provided where one or more steps are added, one or more steps are removed, or one or more steps are provided in a different sequence without departing from the scope of the claims herein.

Figure 2:
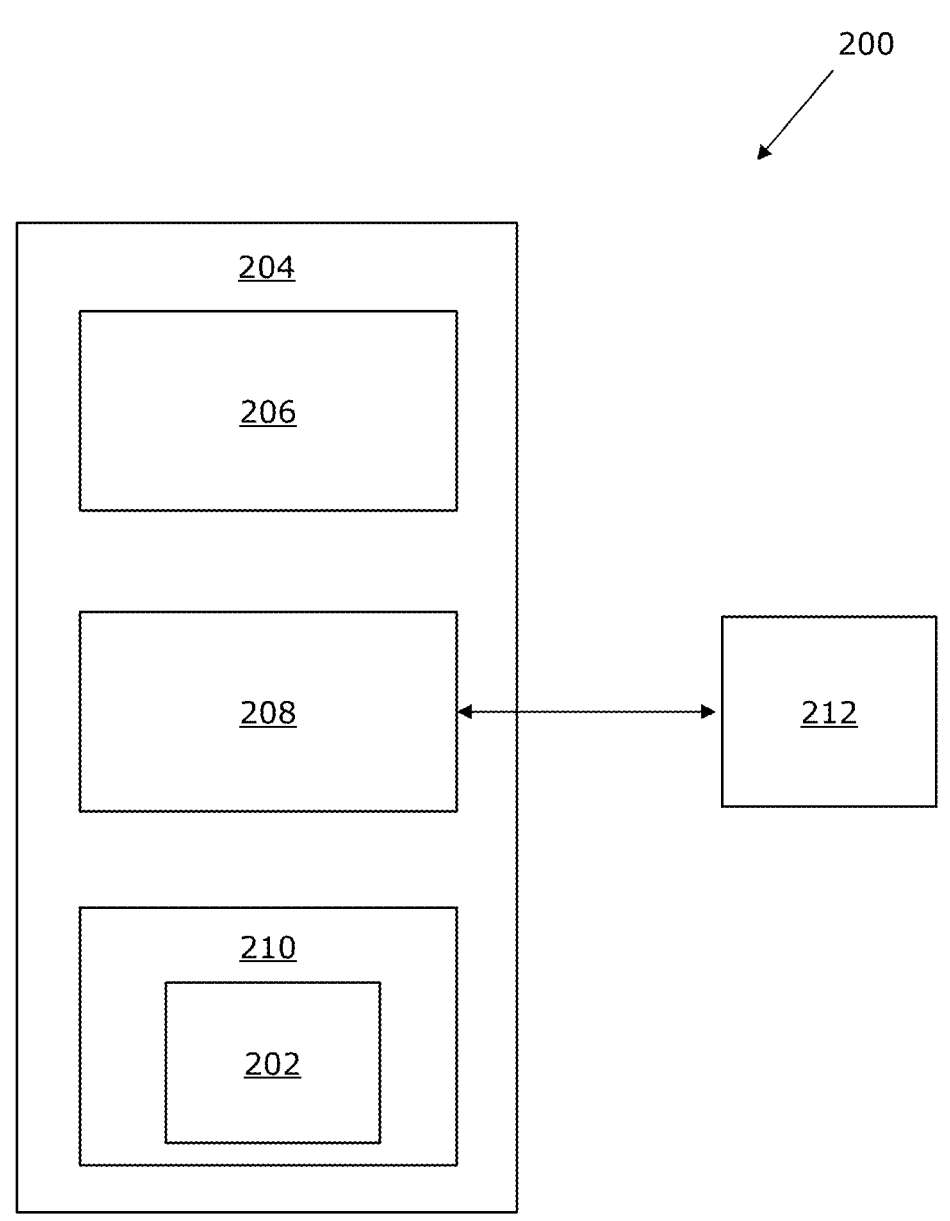
FIG. 2 is a block diagram of a system for preventing fraud in an application executed in a device, in accordance with an embodiment of the present disclosure.

Referring to FIG. 2, illustrated is a block diagram of a system 200 for preventing fraud in an application 202 executed in a device 204, in accordance with an embodiment of the present disclosure. As shown in FIG. 2, the device 204 comprises a display 206 and a computing unit 208 and a memory 210. Herein, the application 202 is stored within the memory 210. Moreover, the computing unit 208 is communicably coupled to a server 212.

Figure 3:
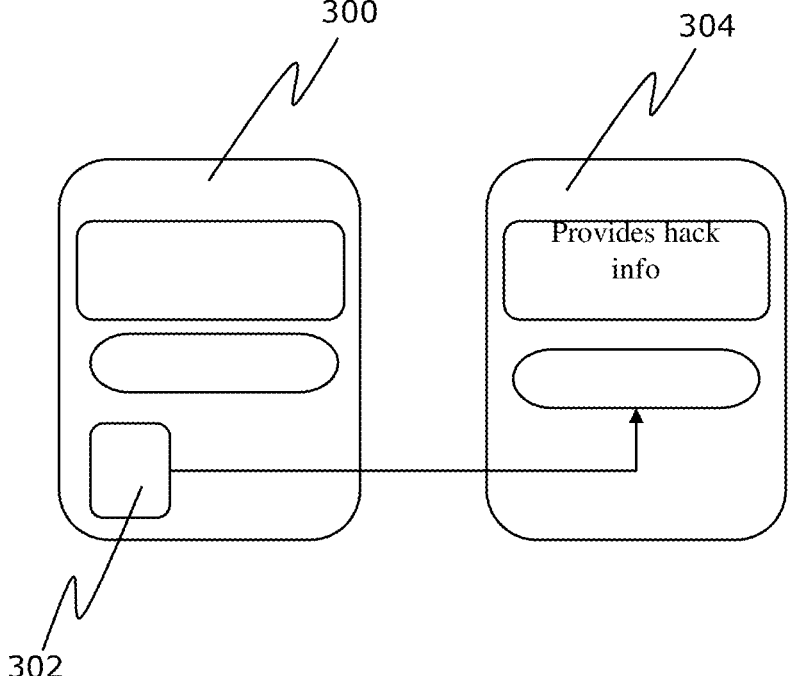
FIG. 3 is a schematic illustration of a fraud being committed in an application, in accordance with an embodiment of the present disclosure.

Referring to FIG. 3, illustrated is a schematic illustration depicting a fraud being committed in an application 300, in accordance with an embodiment of the present disclosure. As shown in FIG. 3, the application 300 comprises a first data model module 302. In a scenario where sensitive information present in the first data model module is being accessed by a user before it is intended to then the user is able to use the sensitive information of the first data model module 302 to commit fraud in a fraudulent application 304.

Figure 4:
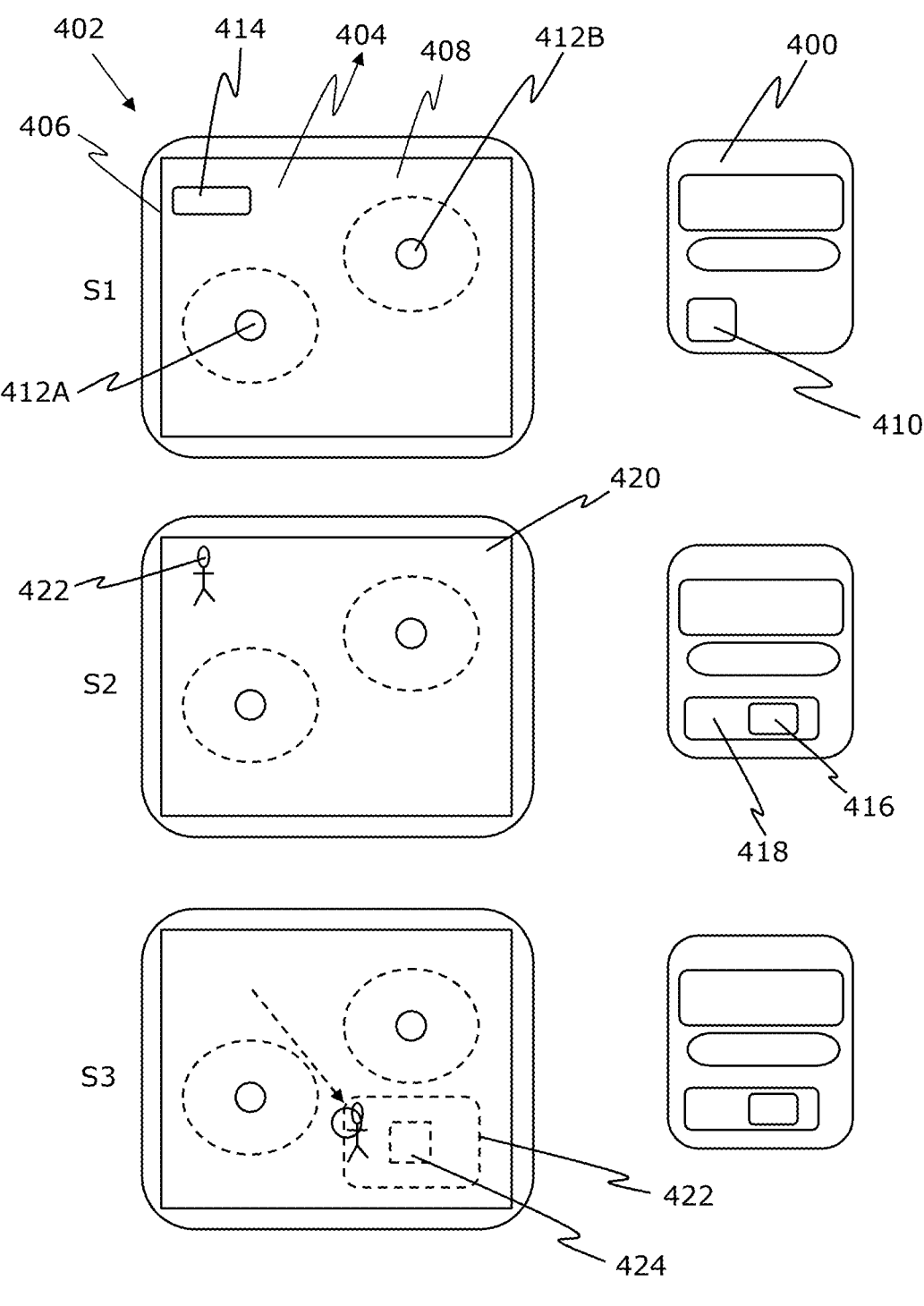
FIG. 4 is a schematic illustration of different steps involved in a method for preventing fraud in an application executed in a device, in accordance with an embodiment of the present disclosure.

Referring to FIG. 4, illustrated is a schematic illustration of different steps involved in a method for preventing fraud in an application 400 executed in a device 402, in accordance with an embodiment of the present disclosure. At step S1, in a user interface 404 of a display 406 of the device 402 a first user view 408 is rendered, based on a first data model module 410. The first user view 408 that is rendered on the user interface 404 depicts a set of visible graphical objects (depicted as a first visible graphical object 412A and a second visible graphical object 412B). Subsequently, a user interface element 414 present in the user interface 404 is pressed by a user which acts as a triggering event. At step S2, after the triggering event is detected, first data model module 410 is updated based on an update data module 416 to get an updated first data model module 418. Subsequently, based on the updated first data model module 418, an updated user view 420 is rendered in the user interface 404. The updated user view 420 depicts a user controllable graphical object 422 along with the set of visible graphical objects 412A and 412B. At step S3, as the user controllable graphical object enters within a boundary 422 of a hidden graphical object 424, then the hidden graphical object 424 is rendered in the updated user view 420 to be made visible to the user.

Figure 5:
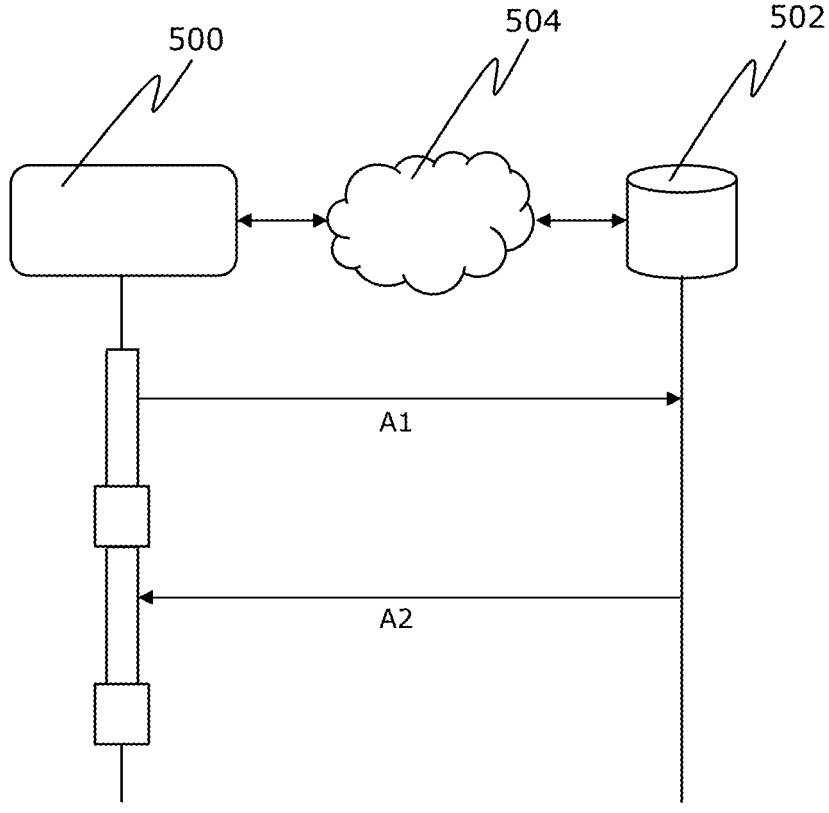
FIG. 5 is a schematic illustration depicting an exchange of data between a computing unit and a server, in accordance with an embodiment of the present disclosure.

Referring to FIG. 5, illustrated is a schematic illustration depicting an exchange of data between a computing unit 500 and a server 502, in accordance with an embodiment of the present disclosure. As shown in FIG. 5, the computing unit 500 and the server 502 are communicably coupled via a communication interface 504. At step A1, a request for update is sent by the computing unit 500 to the server 502. At step A2, the server 502 sends an update data module to the computing unit 500. Subsequently, the first data module is updated based on the update data module.

Figure 6:
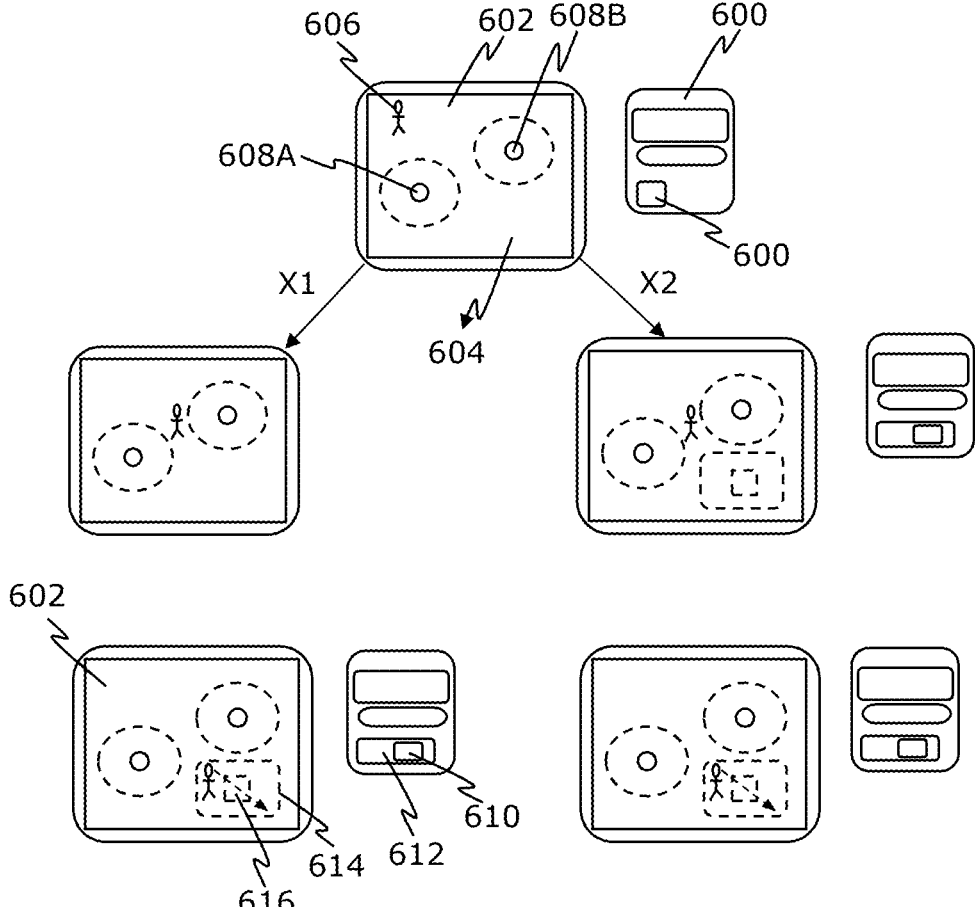
FIG. 6 is a schematic illustration depicting alternate ways for updating a first data model module and rendering an updated user view on a user interface, in accordance with an embodiment of the present disclosure.

Referring to FIG. 6, illustrated is a schematic illustration depicting alternate ways for updating a first data model module 600 and rendering an updated user view 602 on a user interface 604, in accordance with an embodiment of the present disclosure. As shown in FIG. 6, a first user view 606 for an application 608 is rendered in the user interface 604 based on the first data model module 600. The first user view 606 depicts a set of visible graphical objects 608A and 608B, and a user controllable graphical object 610. Optionally, according to a scenario X1, the first data model module 600 is updated using an update data module 612 to get an updated first data model module 614, when the user controlled graphical object is within a boundary 616 of a hidden graphical object 618. Alternatively, according to a scenario X2, the first data model module 600 is updated using the update data module 612 to get the updated first data model module 614, when the user controlled graphical object is on a path towards the hidden graphical object 618.

Figure 7A:
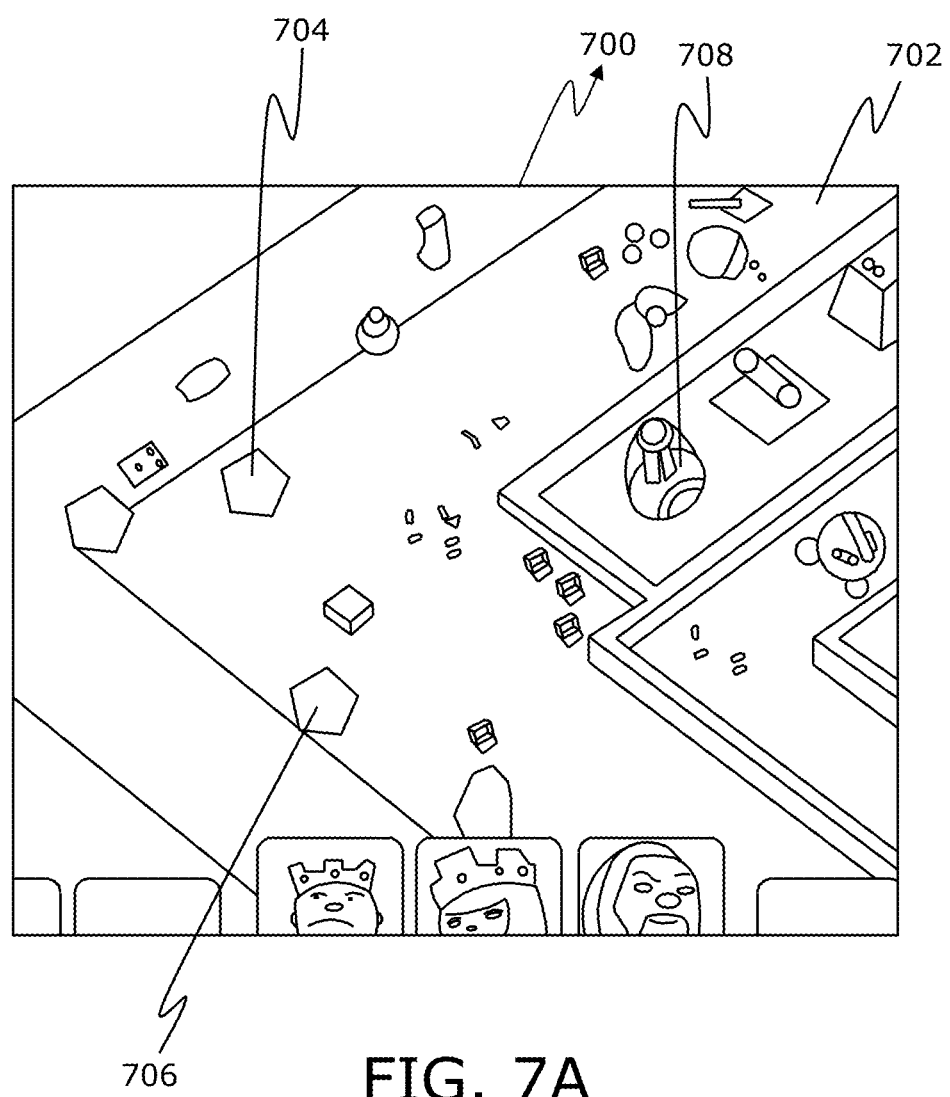
FIGS. 7A, 7B and 7C are schematic illustrations of different user views rendered in a user interface, in accordance with an embodiment of the present disclosure.
Figure 7B:
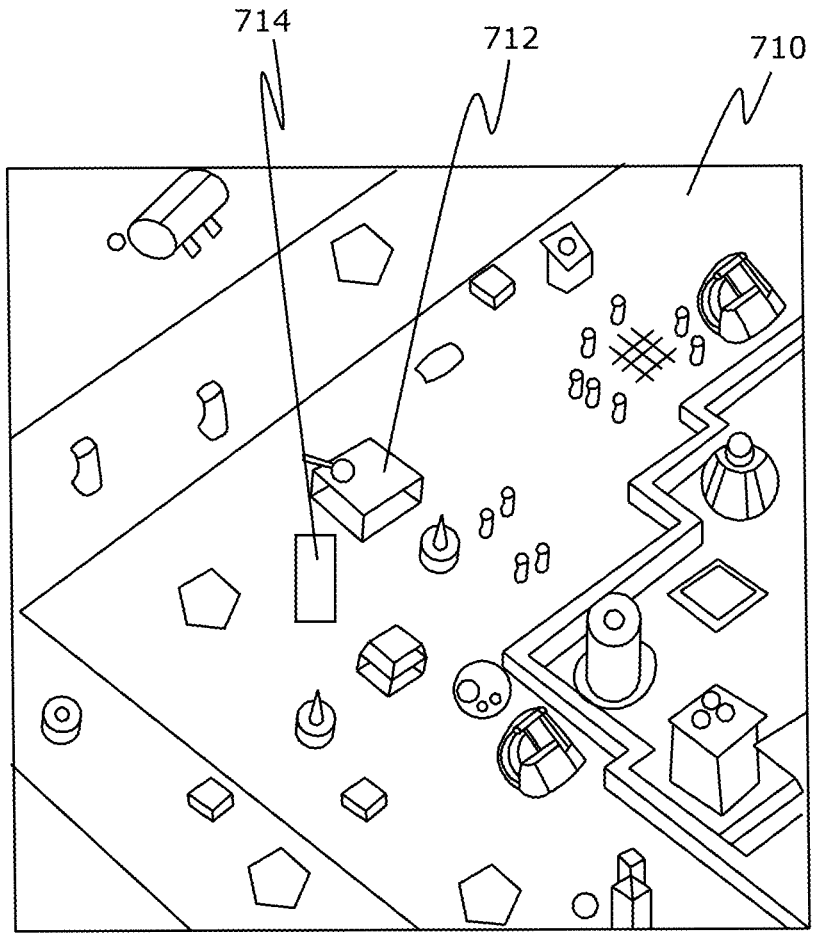
Figure 7C:
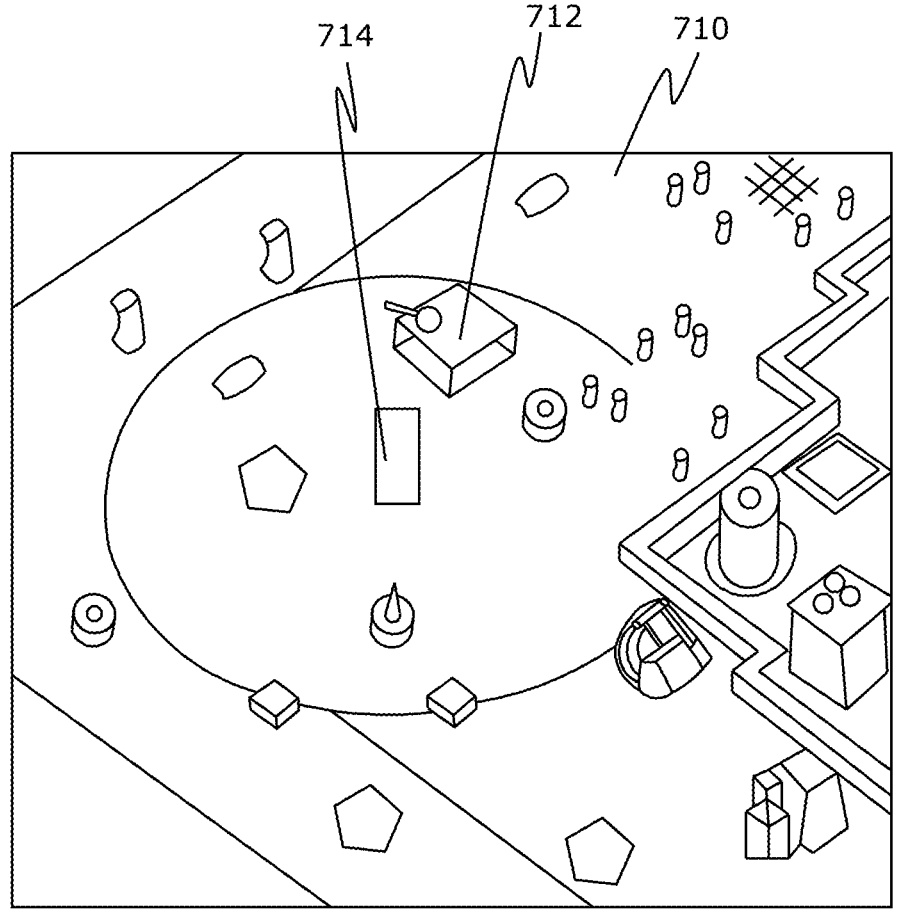

Referring to FIGS. 7A, 7B and 7C illustrated are schematic illustrations of different user views rendered in a user interface 700, in accordance with an embodiment of the present disclosure. As shown in FIG. 7A, a first user view 702 is rendered in the user interface 700. Herein, the first user view 702 depicts a set of visible graphical objects 704, 706 and 708. As shown in FIG. 7B, an updated user view 710 is rendered in the user interface 700. Herein, the updated user view depicts hidden graphical objects 712 and 714. As shown in FIG. 7C, the updated user view 710 depicts the hidden graphical objects 712 and 714 interacting with each other respectively.

The invention claimed is:

1. A method for preventing fraud in an application executed in a device, the method comprising:
   providing the application to the device, wherein the application comprises a first data model module and a viewer module, the first data model module excluding data associated with hidden or conditional graphical objects to prevent unauthorized access to such data;
   using the viewer module for rendering on a user interface of a display of the device, a first user view of the application, the first user view comprising a set of visible graphical objects, wherein the first user view is rendered based on data of the first data module;
   detecting a triggering event, indicative of a change in an operational mode of the application;
   based on the detected triggering event, requesting and receiving an update data module from a server, the update data module comprising data corresponding to at least one hidden graphical object that becomes accessible only upon satisfaction of a predefined condition, and updating the first data model module with the received update data module to obtain an updated first data model module;
   after updating the first data model module detecting a control event associated with user interaction within the application; and
   based on the detected control event, rendering an updated user view of the application on the user interface of the device using the updated first data model module, wherein the updated user view renders the at least one hidden graphical object visible only after the control event is detected, thereby preventing fraud or unauthorized advantage by concealing data until legitimate progression occurs.

2. The method according to claim 1, wherein the first user view is a preview mode of the application.

3. The method according to claim 2, wherein the triggering event is at least one of: selection of a user interface element for changing application from the preview mode to an active mode, expiration of a timer associated with the preview mode, or providing an action command to any of the set of visible graphical objects on the user interface.

4. The method according to claim 2, wherein the triggering event is one of: detecting a selection of a user controllable graphical object, a movement of the user controllable graphical object across a boundary in the user interface, a location change of the user controllable graphical object from a first location on the user interface to a second location on the user interface, or a location of the user controllable graphical object within the user interface.

5. The method according to claim 2, wherein the triggering event is created based on timing information based on movement parameters of a user controllable graphical object.

6. The method according to claim 2, wherein the provided update data module comprises data related to at least one of: hidden graphical objects, or parameters of the set of visible graphical objects.

7. The method according to claim 6, wherein the control event is one of: detecting a control input associated with a user controllable graphical object on the user interface, a movement of the user controllable graphical object across a boundary on the user interface, a location change of the user controllable graphical object from a first location to a second location on the user interface, or a distance of the user controllable graphical object from at least one of the hidden graphical objects on the user interface.

8. The method according to claim 7, wherein the rendered updated user view comprises the at least one of the hidden graphical objects rendered to be visible to the user of the user interface of the device.

9. A system for preventing fraud in an application executed in a device, comprising:

the device, the device comprising a display, a computing unit and a memory, wherein:

the application is stored in the memory, and the application comprises a first data model module and a viewer module, the first data model module excluding data associated with hidden or conditional graphical objects to prevent unauthorized access to such data; and the computing unit is configured to execute the application stored in the memory to:

render on the display a first user view with the viewer module using data of the first data model module;

detect a triggering event indicative of a change in an operational mode of the application; and form, based on the detected triggering event, a request for a data update and send the request to a server;

the server configured to:

receive the data update request;

send an update data module comprising data corresponding to at least one hidden graphical object that becomes accessible only upon satisfaction of a predefined condition to the device; and wherein, the computing unit is further configured to update the first data model module based on the update data module to obtain an updated first data model module, after updating the first data model module detect a control event associated with user interaction within the application and render on the display an updated user view using the updated first data model module such that the at least one hidden graphical object is rendered visible only after detection of the control event, thereby preventing fraud or unauthorized advantage in use of the application.

10. The system according to claim 9, wherein the triggering event is at least one of: detecting selection of a user interface element, expiration of timer, a movement of the device, a movement of a user controllable graphical object along the rendered first user view.

11. The system according to claim 10, wherein timing of sending the update data module from the server is based on predicted movement of the user controllable graphical object along the rendered first user view.

* * * * *